United States Patent [19]

Dunbar et al.

[11] Patent Number: 4,795,998
[45] Date of Patent: Jan. 3, 1989

[54] SENSOR ARRAY

[75] Inventors: John H. Dunbar, Swindon; Edward B. Atkinson, Suffolk, both of England

[73] Assignee: Raychem Limited, Swindon, United Kingdom

[21] Appl. No.: 938,346

[22] Filed: Dec. 3, 1986

Related U.S. Application Data

[63] Continuation of Ser. No. 730,396, May 3, 1985, abandoned.

[30] Foreign Application Priority Data

May 4, 1984 [GB] United Kingdom ................ 8411480

[51] Int. Cl.$^4$ .............................................. G01L 1/22
[52] U.S. Cl. ........................................ 338/5; 338/208; 338/259
[58] Field of Search ............... 338/5, 6, 208, 259, 338/270, 47; 174/117 M; 340/665, 666

[56] References Cited

U.S. PATENT DOCUMENTS

| | | | |
|---|---|---|---|
| 3,056,005 | 9/1962 | Larson | 338/208 X |
| 3,293,585 | 12/1966 | Horn | 338/47 X |
| 3,610,887 | 10/1971 | Betzer | 338/47 X |
| 3,711,627 | 1/1973 | Maringulov | 174/117 M X |
| 4,437,505 | 8/1982 | Anderson | 340/666 |
| 4,555,954 | 12/1985 | Kim | 338/47 X |

FOREIGN PATENT DOCUMENTS

| | | |
|---|---|---|
| 3212660 | 10/1983 | Fed. Rep. of Germany . |
| 703758 | 2/1954 | United Kingdom . |
| 723370 | 2/1955 | United Kingdom . |
| 1059186 | 2/1967 | United Kingdom . |
| 1284737 | 8/1972 | United Kingdom . |
| 1331942 | 9/1973 | United Kingdom . |
| 1474078 | 5/1977 | United Kingdom . |
| 1544856 | 4/1979 | United Kingdom . |
| 2034893A | 6/1980 | United Kingdom . |
| 2115555A | 9/1983 | United Kingdom . |
| 2115556A | 9/1983 | United Kingdom . |
| 2127979A | 4/1984 | United Kingdom . |

OTHER PUBLICATIONS

J. A. Purbick, "A Force Transducer Employing Conductive Silicone Rubber", Proc. 1st RoViSeC, Stratford on Avon, England, pp. 73–80 (1981).
J. Severwright, "Tactile Sensor Arrays-The Other Option", Sensor Review, pp. 27–29 (Jan. 1983).
IBM Technical Disclosure Bulletin, vol. 6, No. 3, Aug. 1963, pp. 4 and 5.

*Primary Examiner*—E. A. Goldberg
*Assistant Examiner*—M. M. Lateef
*Attorney, Agent, or Firm*—Simon J. Belcher; Herbert G. Burkard

[57] ABSTRACT

A sensor array, usually a sensor matrix for sensing pressure, comprising a grid of conductors in a woven fabric, the row conductors crossing over the column conductors to form a matrix array of crossover points. The rows are separated from the columns by individually coating the conductors of one or both series with an electrically partially resistive fibrous material, so that when the conductors at any crossover point in the array are pressed closer together, the resistance between the two conductors at that crossover point decreases. By connecting the conductors to suitable electrical circuitry, the force applied at any crossover point and the location of that crossover point within the array can be determined.

26 Claims, 7 Drawing Sheets

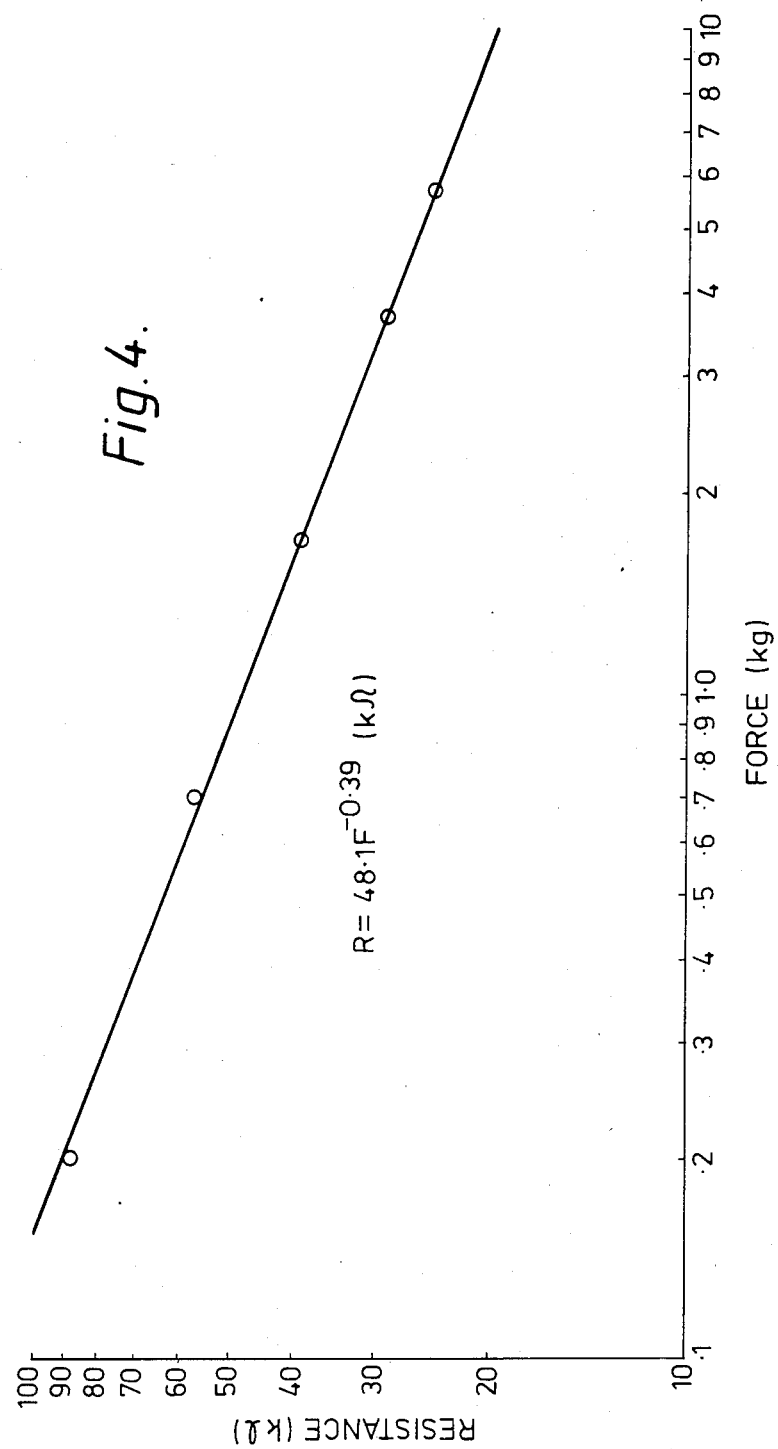

SENSOR ARRAY

This application is a continuation of application Ser. No. 730,396, filed May 3, 1985, now abandoned.

This invention relates to sensors and sensor arrays, and especially to pressure sensor arrays, the term "array" being used herein to mean one or more transducers for a parameter to be sensed, arranged in any order or spatial relationship (including a matrix).

Pressure sensors, by which is meant devices that sense a force applied to a surface, are useful in a number of industrial applications, for example as pressure sensitive mats for door actuators or burglar alarms, or as tactile sensors. The increasing use of mechanical gripping devices in industry, for example in robots that are used for picking up and transferring component parts to a desired location in a desired orientation, has created an increasing demand for reliable tactile sensing devices that indicate the location and orientation of a component to be gripped and, when the gripping device is in position, the quantitative value of the force exerted on the device. In the remainder of this specification, the sensor arrays of the invention will primarily be described with reference to pressure sensors but it will be apparent that at least some devices constructed according to the present invention may be used as sensors for measuring other characteristics, for example temperature, of a body to be contacted.

One known type of sensor is a sensor matrix comprising a grid of electrical conductors, or electrodes, the "rows" of the grid comprising a first series of parallel spaced apart conductors and the "columns" comprising a second series of parallel spaced apart conductors transverse, usually at right angles, to the first to form a matrix of crossover points. This arrangement of conductors in transverse columns and rows will be referred to herein as a grid, and the arrangement of crossover points a matrix. The row series and the column series are separated by a body or bodies, an electrical property, usually resistance, of which varies with some independent variable such as pressure. For example, in a tactile sensor, one series of conductors may be attached to a rigid support and the other may be movable, usually being attached to a flexible support. The body or bodies may be of elastomeric electrically resistive material, and deformation caused by exerting pressure on the movable series of conductors varies, usually increases, the area of material in contact with the electrodes while varying, usually decreasing, the path length in the material and possibly also the contact resistance and/or the inherent material bulk resistivity, thereby varying, usually decreasing, the resistance at the affected crosspoints of the conductors.

In certain proposed sensors, the separating body is in the form of a continuous mat. In another kind of sensor, described by J. A. Purbick in a paper in Proc. 1st RoViSeC., Stratford on Avon, England, April 1st–3rd, 1981, pp 73 to 80, entitled "A force transducer employing conductive silicone rubber", strips of conductive silicone rubber are arranged in a grid and electrical sensing wires may be inserted at intervals along the rubber strips or may be laid in longitudinal slits subsequently cut in the strips for that purpose.

Crossover points may be isolated from neighbouring devices in a matrix of crossover points (to allow accurate electrical measurement of a single crosspoint) by conventional guarding techniques, or by addition of components with isolating capabilities such as diodes or FET's.

Instead of using discrete conductors, at least one series may be in the form of a sheet or foil having parallel conductive elements separated by alternating insulating elements, (e.g. as in a printed circuit board).

Previously proposed sensor arrays suffer from a number of disadvantages. In the Purbrick paper for example, the problems experienced with silicone rubber because of its tackiness and tendency to creep are mentioned. These problems limit the use of the device by making results erratic at the sensitivity required for measuring low forces. The hysteresis caused by long creep-related settling time is also a problem. The inevitable crosstalk, caused by leakage of currents within the mat-type transducers also detracts from the performance of previously proposed devices.

The present invention relates to an improved sensor array.

The invention accordingly provides a sensor matrix comprising first and second sets of conductors, the first set crossing over the second set to form a matrix of one or more crossover points, and being separated from the second set at least at one crossover point by an electrical transducer material, the first set and the second set being incorporated in a single fabric, or respectively in separate fabrics, advantageously a woven fabric or fabrics. Advantageously, the conductors are incorporated, as by being included in the warp or weft of a woven material, so that they project from one surface of the fabric. In this aspect of the invention, the conductors so incorporated are covered at least on the side facing the other series of conductors, and preferably completely, by the electrical transducer material, advantageously a fibrous material. In a preferred embodiment, both series of conductors, the rows and columns, are incorporated in such a fabric such that the exposed surfaces of the transducer material of one series contact those of the other at the crosspoints without any substantial contact force until a pressure is applied to the fabric surface.

Preferably the first set of conductors is separated form the second set at substantially all the crossover points in the array, such that each crossover point is a transducer, preferably a pressure transducer.

As well as being woven the conductors may be braided or inserted into a knitted fabric, in either case each crossing point advantageously forming a pressure transducer. Alternatively the conductors may be bonded or stitched onto a fabric.

In this aspect as in any additional aspect of the invention, a sensor matrix includes any array of one or more crossover points and is usually a substantially 2-dimensional array. Advantageously the first and second sets of conductors are in the form of a grid, the first set being a series of row conductors and the second set being a series of column conductors. The grid may be 2- or 3-dimensional, but is usually substantially 2-dimensional. Each row and each column in the grid may be straight, curved, for example circular or spiral, or of any regular or irregular form, and the spacing and angles between each row, between each column and between each row and column need not be uniform. Preferably, however, the sensor is a regular matrix formed from a grid of substantially straight rows and columns at substantially right angles to each other, although other grid arrangements, such as a "spider's web" are also included.

In addition to the applications mentioned above, the sensor of the present invention may be used in a number of novel applications which are described below.

In a further preferred aspect of this invention, the sensor matrix comprises first and second sets of conductors, the first set crossing over the second set to form a matrix of one or more crossover points, at least some of the conductors, preferably one set of conductors, being at least partially surrounded by, and advantageously having helically would thereabout, a transducer layer of fibres capable of acting to produce a detectable change in electrical properties in response to a condition to be sensed by the sensor. Preferably these fibres are of carbon, partly carbonised polyacrylonitrile, silicon carbide or textile fibres loaded with electrically partially resistive material such as carbon particles or partially resistive polymer material (e.g. polypyrrole suitably doped). The fibres may be loaded with the partially resistive material either before or after being wrapped around the conductors. Any other suitable method may be used to cover the conductors with the fibres, e.g. braiding.

This form of the invention provides improved uniformity of electrical resistance at the points throughout the array and greater change of resistance due to the large number of electrical contact points provided by the fibres at each crossover point in the array.

The fibres may comprise one or more continuous filaments (for example a continuous tow) or may comprise a large number of short-length fibres (spun staple fibre). Preferably spun table fibre is used to minimise electrical paths along the length of the fibre layer. It is also preferred to surround the conductors with two or more layers of the fibres. The layers may be continuous along the length of each conductor to which it is applied or may be discontinuous. Any suitable medium may surround the individual fibres in the layer. This is usually air but may also be silicone grease, oils, hydrophobic gels for example, and an anti-oxidant may be included to extend the life-time of the fibres.

The layer of electrical transducer material surrounding the conductors may be surrounded by a thin protective layer of electrically partially resistive material, for example a heat-shrunk or extruded partially resistive polymeric layer. This layer may also be continuous or discontinuous along the length of each conductor to which it is applied.

In another aspect of the invention, and it will be understood that a given device may embody only one aspect or, unless otherwise indicated, any two or more aspects, of the invention, there is provided a sensor comprising an array of spaced apart electrical conductors which are substantially uniformly and individually surrounded by a layer of electrical transducer material, which may be continuous, particulate or fibrous, capable of acting to provide a detectable change in electrical properties in response to a condition to be sensed by the sensor.

The substantially uniformly surrounded conductors of this sensor array, usually a matrix array, can advantageously be incorporated into a fabric or fabrics, as described above, to produce sensors of acceptable uniformity.

In this case, as in all other aspects of the invention, one series of conductors may be positioned on a rigid or flexible support. The other may be unsupported, or supported or covered by a flexible material.

Suitable supports include, for example, rigid or flexible polymeric materials which may be electrically insulating such as polyphenylene sulphide filled with chopped glass fibres (RYTON—available from Phillips Petroleum) or a glass-fibre filled epoxy resin circuit board, polyfluorocarbon or polyamide sheets or tape or fabric. The sensor may be self-supporting when one or both series of conductors are incorporated into a fabric. Alternatively, or in addition, the array as a whole may be covered with a pressure-transmitting layer for mechanical and for environmental protection. Suitable materials include a Kevlar fabric, a glass-fibre fabric, a polyvinylidene chloride sheet, or plasticised polyvinyl chloride which may be reinforced with terylene fibres (for example fire hose material).

In another aspect, the present invention provides a sensor matrix comprising first and second sets of conductors, the first set crossing over the second set to form a matrix of one or more crossover points, the first set being separated from the second set by a crosslinked polymeric electrical transducer material, advantageously a crosslinked elastomer filled with electrically conductive material.

It has been found that by using a crosslinked polymer for the electrical transducer material permanent set is reduced.

In another aspect of the invention, there is provided a sensor matrix comprising first and second sets of conductors, the first set crossing over the second set to form a matrix of one or more crossover points, the first set being separated from the second set by a hard elastic electrical transducer material. This material may be in the form of fibres, particles or a continuous layer.

"Hard elastic" material is understood herein to mean a material having a Rockwell Hardness greater than R100, measured in accordance with ASTM D785, and an elastic modulus greater than ($2 \times 10^5$ pounds per square inch) 1379 MegaPascals.

The hard elastic transducer material may be applied to the conductors by any one of a number of methods, the material determining the method of application. The material may be for example a carbide, oxide, boride or nitride of elements such as silicon, tungsten or other appropriate metals, for example silicon carbide or may be elemental silicon or carbon in suitable physical forms, e.g. amorphous silicon or amorphous carbon. Suitably hard organic materials may also be used, e.g. partly carbonised polyacrylonitrile (PAN) or polypyrrole. The desired properties of the material, for example resistance, may be adjusted if required, e.g. by doping of silicon or by controlling the degree of carbonization of PAN. The hard elastic material may inherently be a transducer material, for example by being electrically partially resistive transducer material. Alternatively the hard elastic material may be modified to become a transducer, for example by impregnating or coating a textile fibre with an electrically partially resistive material.

The use of hard elastic materials is advantageous in that the array suffers less permanent resistance drift after loading, since compression set is much reduced compared, for example, with previously proposed elastomeric material. Since the thickness of the hard elastic material may be small compared with that of elastomeric material, high spatial resolution is possible, especially when fine conductors are chosen. When the materials are refractories or high melting point organic fibres, high operating temperatures are possible.

Preferably the electrical transducer material according to any aspect of the present invention is an electrically partially resistive material, although other electrical variables, such as capacitance for example, may be used if appropriate.

In all aspects of the present invention, references to an electrically partially resistive material mean a material that has a resistivity greater than, advantageously at least 10 times greater than, preferably 1000 or more times greater than, that of the conductor with which it is associated and, if it is associated with two or more conductors of different resistivities, then it should be greater than that of the conductor of the higher or highest resistivity. Advantageously, the resistivity of an electrically partially resistive material in the devices of the present invention is at most $10^{10}$ ohm cm, preferably between $10^{-3}$ and $10^{10}$ ohm cm, more preferably between $10^1$ and $10^6$ ohm cm, and especially approximately $10^3$ ohm cm.

Preferred sensor arrays according to all aspects of the present invention are those in which individual conductors of at least one series are individually surrounded with partially resistive material, such that there is an insulating gap between each row in the row series of conductors and/or between each column in the column series, rather than one series as a whole being separated from the other series by a continuous sheet or mat. Advantageously each conductor is surrounded by a material in substantially circular cylindrical form, for example in a fashion akin to a normal insulated electrical wire, but with partially resistive material instead of the usual highly resistive insulation. When only one series of conductors is surrounded by the electrical transducer material, the conductors in the other series may comprise a metal strip or wire or any other suitable conductive material. Precoated (preferably by melt extrusion of the coating) conductors are preferred when continuous partially resistive polymer coatings are used.

The conductors may comprise single or multistranded wires and suitable materials include stainless steel, tinned copper and carbon fibre. The material and diameter of the conductors will depend upon the application of the sensor. For example, for a pressure sensor wherein the conductors are surrounded by a layer of fibrous transducer material a 0.1 mm diameter stainless steel conductor may be chosen where a force of between 0.2N and 5N is to be applied to the conductor at the crosspoint in the sensor array, whereas a 1 mm diameter stainless steel conductor may be chosen for a force of between 2N and 100N. Each row or column in the matrix of conductors may be a single conductor surrounded by the electrical transducer material or may be a plurality of conductors, each conductor being surrounded by the electrical transducer material.

In addition to being continuous or fibrous, the electrical transducer material, usually an electrically partially resistive material, may be particulate. The particulate layer is generally analogous to the mineral insulating layer in a mineral insulated cable, except that the insulating particles are substituted for partially resistive particles, such as graphite powder, to provide a sensor according to the present invention, and preferably the particles are surrounded by an outer jacketing of a flexible conductive material, for example a polymeric layer.

In the preferred embodiment in which the array is in the form of a fabric, the only limit on size is set by weaving (or knitting) machine size and the capacity of the supporting electronics to interrogate thousands of crossover points. Because the sensor array is a fabric, it is flexible and may be formed into any desired shape for example by being bonded to a suitably shaped backing which may itself be rigid or flexible.

In all the above-described aspects, when the array is a pressure sensor, the pressure at each crossover point results in a measurable change in resistance of the current path between the row and the column conductors of the array that meet at that crossover point, thus making it possible to ascertain the pressure exerted at each crossover point. Errors caused by crosstalk may be minimized by the use of appropriate circuitry, for example that described in the Purbrick paper.

In a specially preferred embodiment, the present invention provides a sensor matrix comprising a grid of spaced apart rows of conductors and spaced apart columns of conductors, in which individual conductors in the row, the columns, or both the rows and the columns, are surrounded by hard elastic, electrically partially resistive fibres advantageously helically wound thereabout and the rows and columns surrounded by the fibres are each woven into the same or a different fabric.

With suitable polymeric coatings on the conductors, which may be the partially resistive polymer coating or a coating over fibrous or particulate partially resistive materials, the crossover points may be bonded together by application of solvents or heat and pressure or with a conductive adhesive to provide greater physical stability of the structure, and the bonds may be subsequently crosslinked together with the remainder of the coatings.

An alternative method of constructing the array is to arrange the array of conductors as required then apply at coating of a transducer material by dipping, painting or spraying the array with a suitable composition. Surface tension effects will tend to draw the composition in between the respective conductors to form bonded crossover points.

In addition to pressure, other parameters, such as temperature can also be sensed by a sensor according to the present invention.

For a temperature sensor it is advantageous to surround the conductors with a transducer material having significantly negative (NTC) or positive (PTC) temperature coefficient of resistance.

Suitable NTC materials includ for example semiconducting coatings of materials such as carbonised polyacrylonitrile or doped amorphous silicon; PTC materials include for example the well known blends of carbon black and organic polymer material widely sold as "Autorace" (Trade Mark) self-limiting heating cables by Raychem Corporation, such materials being described in numerous published patent specifications.

The crossover points in the grid of conductors may be bonded together as described above. This is especially useful in temperature sensors where it is desirable to limit geometric movement at the crossover points so that substantially only the changes in resistance attributable to the temperature change will be measured.

Sensor arrays, especially pressure sensor arrays, constructed in accordance with the invention have many applications. Arrays of pressure sensors may be used to generate pressure maps of large or small areas corresponding to objects, such as people or packages, on a surface. In some cases this information may need to be continuously displayed in "real time" on a monitor such as a VDU; in others the information covering a particular time span may be stored to be examined at a later date, either on a VDU or in some other format, for example as a printed output of values.

Since the information from the array may conveniently be input into a microcomputer, the data may then be manipulated in a variety of ways depending on the needs of the particular application. For example, the total load exerted on a particular area of the array (or the whole area) may be calculated since the area and the pressure on each crossover point are known. Other quantities such as the centre of mass may be calculated. In some applications only the area covered may be of interest and, for example, the percentage of the total area above some threshold pressure may be calculated. In other applications object or character recognition may be required. The pressure data maybe in a similar form to digitised visual information from cameras, for which it is well known that computer algorithms exist to recognise shapes or characters. For example, such vision systems are used to give feedback information to control assembly robots.

A pressure sensor according to the present invention can be used to improve mechanical gripping devices, especially for detecting orientation of parts, and slip detection in robots, and similar devices in the biomedical field, for example as a synthetic skin. Other medical applications include a pressure sensing sheet for use in beds or wheelchairs for the prevention of sores, a sheet or pad for measuring the pressure distribution in a footprint for gait analysis.

The pressure sensor of the present invention is also useful for the transport industry. Weighbridge systems incorporating a pressure sensing mat or pad could measure the load distribution of the vehicle by measuring the load at each wheel, rather than just the total load of the vehicle as measured by current weighbridges. Portable weighbridges, for example comprising a pressure sensing mat which can be rolled up, are now possible using the present invention. By laying a pressure sensing strip across a road a traffic census can be carried out measuring, for example, tyre width, load wheel spacing, spacing between vehicles, speed and density of traffic. A sensor can also be incorporated into a dummy head to measure the distribution of impact pressures for vehicle safety testing.

Another application is in lift or elevator systems. A pressure sensing mat can be layed over a lift or elevator floor to determine the total or distribution of load and/or area coverage on the lift or elevator floor. Thus when there is no more room for another passenger, for example the lift need not make unecessary stops.

Still a further application is for measurement of large area load distribution or area coverage. This is particularly important in aircraft or ship cargo areas where lugguge and other cargo must be distributed evenly in weight.

Other applications of a sensor according to the present invention include security systems, such as burglar alarm mats or carpets, civil engineering and mapping of vibratory patterns.

Various sensors constructed in accordance with the invention will now be described by way of example only with reference to the accompanying drawings in which:

FIG. 4 is a graph of resistance against force of a pressure transducer;

Figure 1:
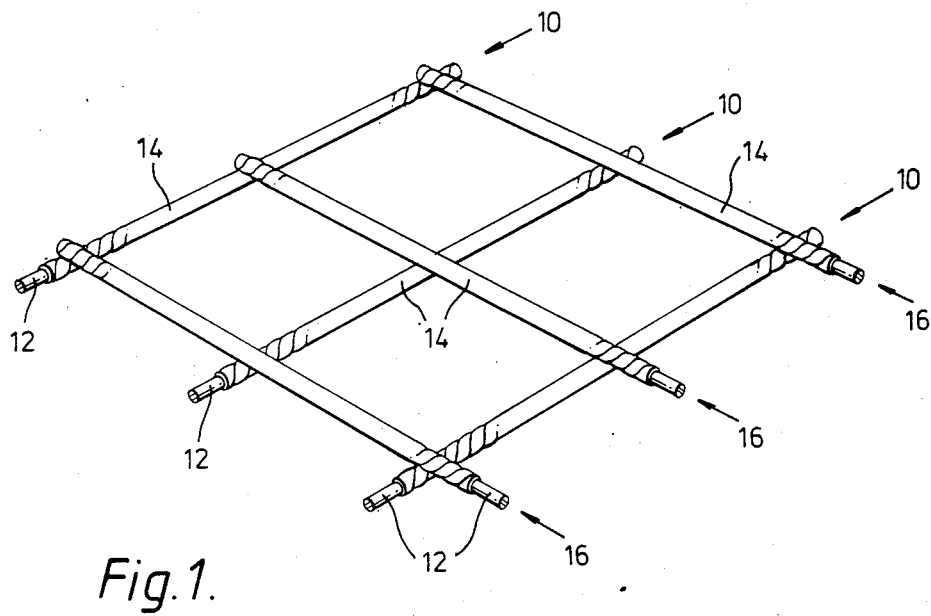
FIG. 1 is a view of a sensor array in which the conductors are individually surrounded by helically wound fibres.
Figure 1A:
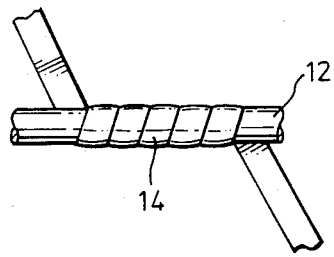
FIG. 1A is an enlargement of the circled part of FIG. 1.

Referring now more especially to FIGS. 1 and 1A, the rows 10 of a grid comprise conductors 12 each individually surrounded by partially resistive material 14 in circular cylindrical form. The material 14 may be a continuous body of crosslinked elastomer but is advantageously helically wrapped fibres as illustrated. Preferably the fibres are spun staple fibres. Positioned at right angles thereto are columns 16, similarly comprising conductors 12 surrounded by the material 14, the rows and columns forming a matrix of crossover points 15. When pressure is exerted on the crossover point between one column conductor and a row conductor, then the material 14 lying between the two conductors 12 will be compressed. This will both increase the contact area between the material on the row and the column, shorten the distance between the conductors, and, in the case of a fibrous coating, also increase the number of points of electrical contact in the fibrous layer (each contributing to reducing the resistance).

Figure 2:
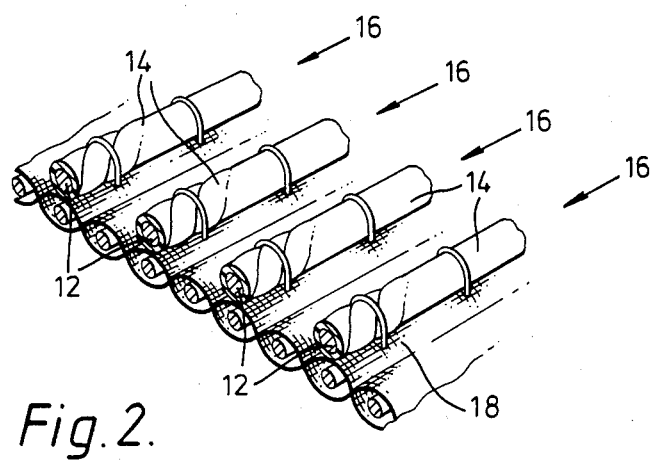
FIG. 2 is a perspective view of part of an array in which the series of conductors is woven into a fabric.

Referring now to FIG. 2, columns 16 of conductors 12 surrounded by the material 14 in cylindrical form are woven into or stitched onto fabric 18 so thart most of the outer surfaces of the material 14 stand proud of the plane of the cloth. This allows contact to be made with the material (not shown) of a similar fabric.

Figure 3:
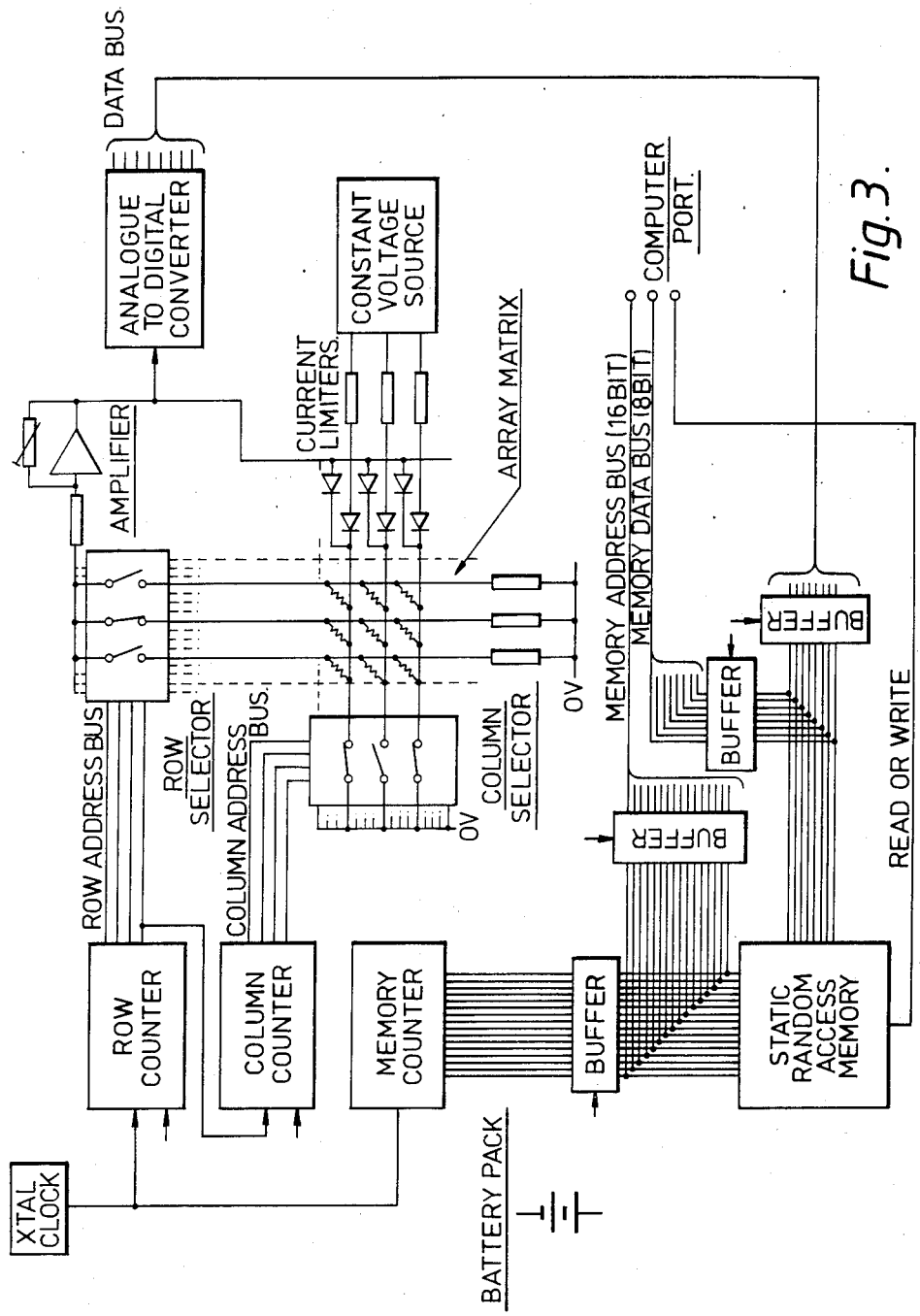
FIG. 3 is a block diagram of a means for interrogating an array.

Device resistance may be measured by any one of a number of methods, for example, the potential divider method. That is by measuring the voltage across a series standard measurement resistor for a standard applied voltage; or e.g. by measuring the voltage across the device for a standard applied current; or e.g. by measuring the current for a standard applied voltage. In each case the device being measured will preferably be selected and isolated by control of row/column potentials and currents, the control and measurement being preferably computer controlled. This facilitates rapid interrogation of each device, and FIG. 3 shows schematically suitable interrogation circuitry for a 16×16 sensor array.

The resistance of a crossover point of a single row and column conductor can be measured. Alternatively, within each series of conductors, a number of conductors can be connected together to form a group, and the resistance of the crossover point between this group as a whole and the associated conductor or conductors from the other series can be measured. A group of conductors connected together has the advantage that the resistance measured is the parallel summation of the resistances at each crossover point and the total resistance measured, for a given pressure, is consequently more consistent. Also a higher total force may be applied to the group of conductors than to a single conductor.

The resistance of a typical pressure transducer, such as a crossover point in a typical pressure sensor array, for a given applied force is shown by the graph of FIG.

4. The transducer comprises a 1 mm diameter multi-stranded stainless steel conductor surrounded with six helical wraps of partially pyrolysed polyacrylonitrile fibres, and a 1 mm diameter tinned copper strip conductor positioned at right angles to the steel conductor.

Figure 5:
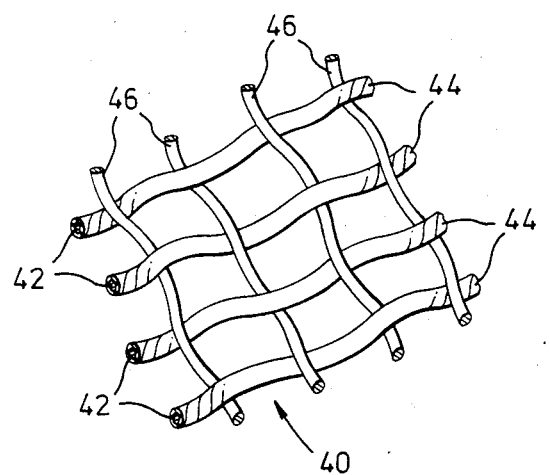
FIGS. 5, 6 and 7 are perspective views of an array in which the rows and columns are woven.

Referring now to FIG. 5, there is shown a woven matrix array indicated generally by the reference numeral 40, comprising row conductors 42 surrounded by partially resistive material 44 and column conductors 46. Pressure applied at any crossover point between the row and column conductors will cause change in th resistance to be scanned along the appropriate conductors. The column conductors 46 may be surrounded by the material 44 instead of the row conductors 42.

Figure 6:
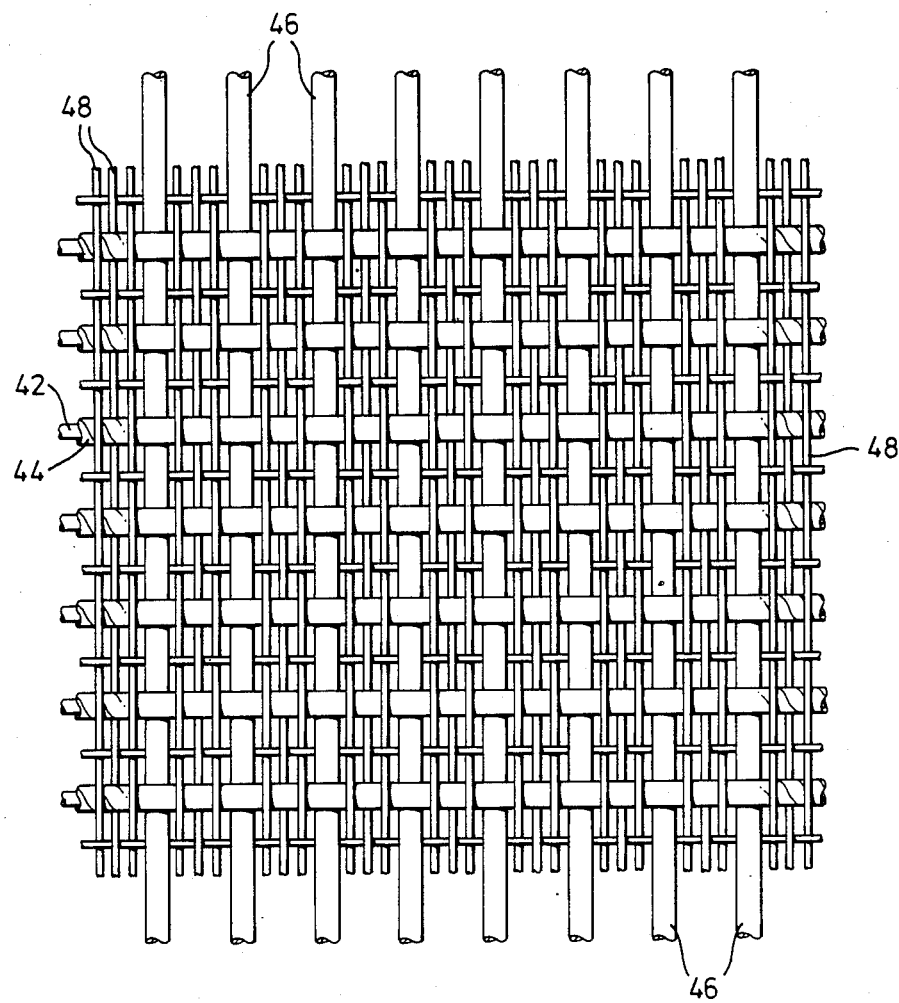

FIG. 6 shows another form of woven matrix array in which the row conductors 42, surrounded by electrically partially resistive material 44, form the weft of the fabric and the column conductors 46 form the warp. Filler fibres 48, made from an inert material such as glass, Kevlar or Rayon, are also woven into the array.

Figure 7:
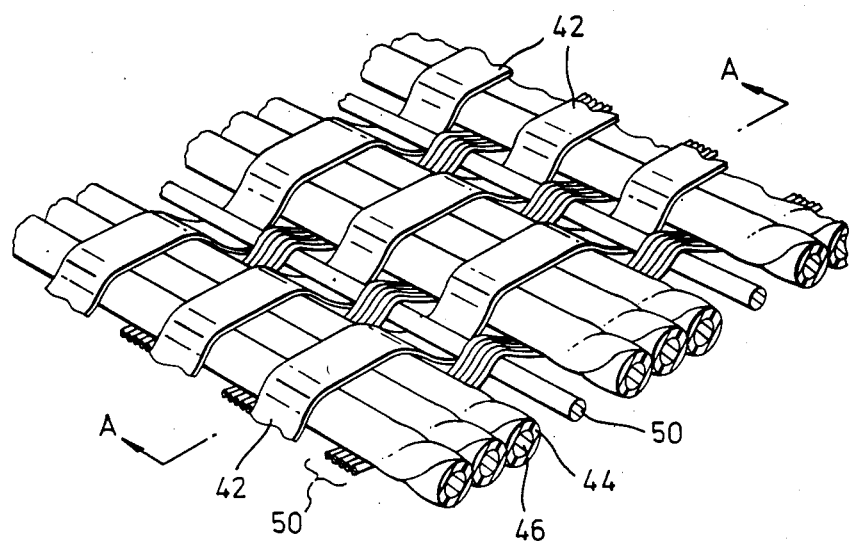
Figure 8:
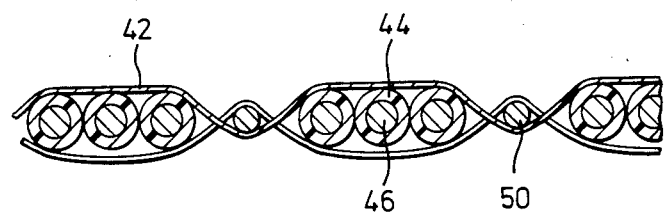
FIG. 8 is a cross-section taken along line A—A of FIG. 7.

In FIG. 7 the woven matrix array comprises column conductors 46, each surrounded by partially resistive material 44. Each column in the array consists of a group of three column conductors. The row conductors 42 are in the form of metal strips. Multifilament glass fibres 50 are also woven into the array. The cross-section of the woven array of FIG. 7 taken along the line A—A is shown in FIG. 8.

In one form of the invention, at least some of the crossover points in a sensor array are individually formed so as to be mechanically independent of the adjacent points in the sense that the amount of movement experienced on application of pressure in use at any one point will not cause significant movement to be transmitted to the adjacent points. The advantage of such mechanical independence will be seen by comparison with a sensor matrix in which the rows and columns comprise relatively rigid electrical conductors. In such a matrix, application of pressure to a single crossover point will tend to cause significant movement, and hence a false signal, at one or more adjacent points.

The desirable mechanical independence could be achieved simply by having sufficient slack in the conductors between crossover points. In that case it will usually be preferable to place the array on a support and take the "excess" lengths of conductors behind the support so as to avoid having loose lengths of the conductors on the face of the array. The crossover points will thus be formed by loops of conductor protruding from the support. It may be more preferable in some cases for one or both conductors at each crossover point to be physically discrete loops of flexible conductor rather than parts of a single continuous flexible conductor. These discrete loops of conductor may if desired be electrically separate from each other, in the sense that each length is separately energisable.

The support may be a continuous solid or a discontinuous body such as a fabric and it will be realised that at least some forms of such looped arrays may be produced entirely by weaving or similar techniques using a combination of suitably coated electrically conductive strands and electrically insulating strands.

Although only one of the two conductors at each crossover point need carry the transducer material, in which case the other could be a bare conductor, both conductors may also carry the transducer material.

Figure 9:
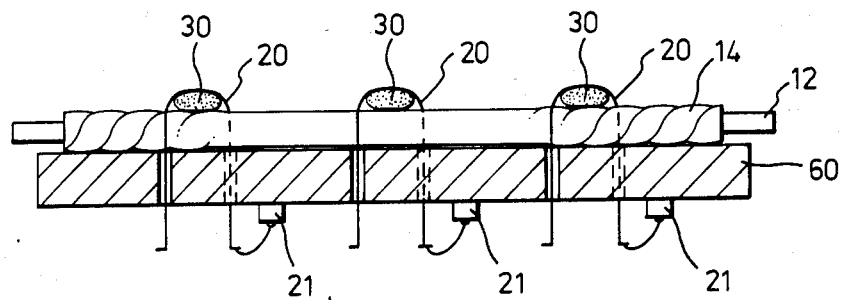
FIGS. 9 and 10 are side and top views of an alternative form of matrix using loop conductors.
Figure 10:
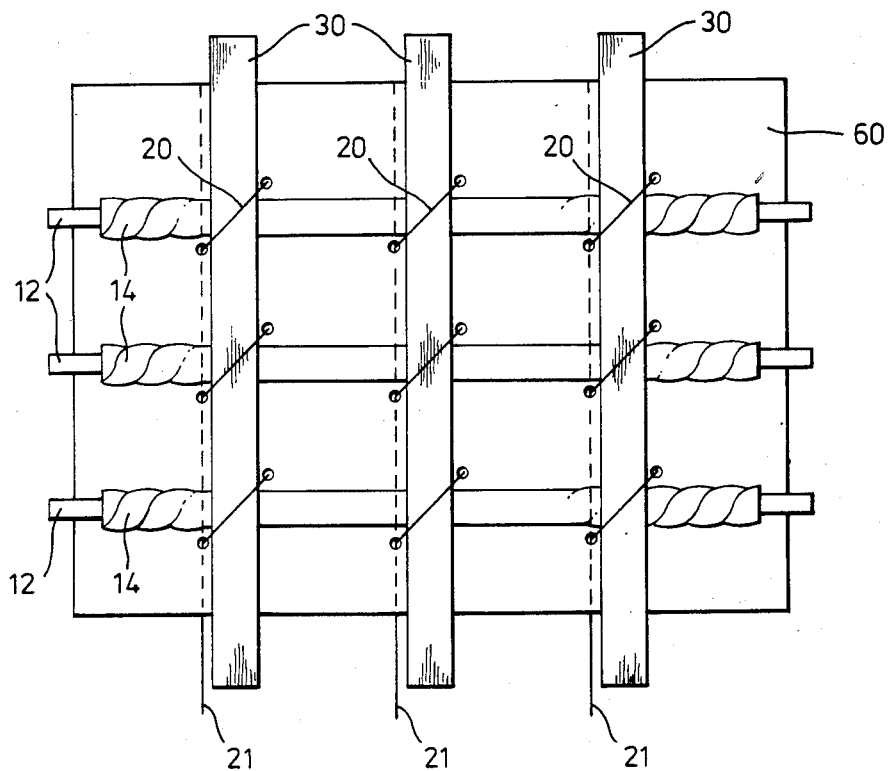

One possible form of looped sensor array is shown in FIGS. 9 and 10, in which a rigid circuit board 60 supports a matrix of (a) continuous straight row conductors 12 carrying the spirally wrapped fibrous transducer material 14, and (b) physically discrete column loops 20 of uncoated conductor. The loops pass through the circuit board and are electrically connected to a conductive track 21 on the reverse side of the board. The other end of each loop can be suitably anchored (not shown) to any insulating part of the board, and although shown as passing through the board need not do so.

The illustrated sensor matrix incorporates an optional feature in the form of lengths 30 of the fibrous transducer material which tend to enhance the signal generated by pressure on the loops in use, and may enhance the physical appearance and feel of the sensor for some purposes. The lengths 30 may be incorporated in the sensor in addition or instead of the layer 14. The following examples illustrate the invention.

EXAMPLES

Using Partially Resistive Fibres to Coat Conductors

Example 1

Partially Resistive Cotton Fibres

A length of cotton twine (0.2 mm diameter) is rendered partially electrically resistive by soaking in a pyrrole solution in methylene chloride followed by immersing it in ferric chloride solution. The absorbed pyrrole is oxidized and forms polypyrrole which due to the presence of $Cl^-$ counter ions, is electrically partially resistive.

The cotton is dried and is then helically wound onto 22 standard wire gauge tinned copper wire so as to form two layers of cotton.

A series of 5 cm lengths of these coated wires are laid parallel to each other with 2 mm spacing on a suitable insulating board. A second similar series is overlayed on the first at right angles.

The wires are held together by interweaving insulating lacing threads and the two sets of wires are connected to suitable multiplexing electronics to measure the resistance at each point on the matrix so formed.

The resistance values are converted to force or pressure values by means of a calibration routine automatically driven by computer software. The force values at each point may for example be displayed on a screen as a numerical value or as a colour map.

Example 2

Polyacrylonitrile Fibres

Lengths of staple fibres consisting of 10 micrometer diameter oxidised polyacrylonitrile fibres were twisted together to form a spun fibre of approximately 900 decitex. This spun fibre was used to cover 22 standard wire gauge stainless steel wires by braiding. The coated wires are then woven together to form a matrix of crossover ponts. Other suitable fibres may optionally be incorporated into this weave for strengthening or electrically insulating purposes.

The "fabric" so formed was then pyrolised in nitrogen at ca. 700° C. The fibres were partially carbonised and consequently were electrically partially resistive.

As in example 1 the matrix may be connected to suitable electronics for interrogating each crossover point and the pressure at each point calculated and displayed.

Example 3

Example 2 was repeated except that the oxidised polyacrylonitrile fibre was helically wrapped around a 1 mm diameter stainless steel wire. Six layers of the fibre were wrapped around the wire, and the coated wires were pyrolised prior to weaving into a fabric with 1 mm diameter tinned copper strips.

Example 4

Conductors surrounded with polyacrylonitrile fibres were made as described in Example 3. Short lengths of thin heat-shrinkable sleeves of an electrically conductive polymeric material were then shrunk onto the fibre surrounded conductors at regular intervals along its lengths. These coated conductors were then woven into a fabric together with lengths of metal conductors to form a matrix array with the polyacrylonitrile fibres as the weft and the metal conductors as the warp. The lengths of heat-shrunk sleeve coincided with the crossover points in the array.

Example 5

Example 4 was repeated except that the short lengths of heat-shrunk polymeric sleeves were replaced by a thin extruded layer of conductive elastomeric material.

Using Partially Resistive Elastomers

Example 6

A mixture of ca. 12% conductive black by weight (such as Ketjen Ec-Trade Mark) and EPDM (Vistalon 2504-trade Mark) and suitable antioxidants (and cross-linking agents) is blended together using conventional plastics mixing equipment.

The compound is then pelletised and then extruded onto fine wire in a cross-head extruder.

The coated wires are then irradiated to ca. 10 Mrad using high energy electrons. This crosslinks the polymer and thereby reduces its tendency to compression set under load.

Lengths of this coated wire are stitched into a supporting fabric so as to form a matrix of crossover points.

As in the previous examples the pressure at each crossover point may be determined and displayed.

Using Partially Resistive Particles

Example 7

A thin wall tube made of conventional polymeric material and loaded with carbon black powder to render it partially resistive was extruded. A wire conductor was inserted into the tube with suitable spacers to ensure that it did not touch the wall of the tube. Using an air stream, the tube was then filled with partially resistive particles selected from graphite powder, boron carbide, silicon carbide, nickel oxide, iron oxide or metal coated glass spheres, for example.

A number of these filled tubes are then woven into an array to form a matrix of crossover points.

After extrusion of the thin wall tube but before being filled with the particles, the tube may be crosslinked, for example by irradiation, and expanded to render it heat-shrinkable. This tube may then be shrunk onto the partially resistive particles, in some cases advantageously compressing the particles together.

Temperature Sensor

Example 8

A PTC polymeric material is extruded onto a wire conductor in a cross-head extruder. The coated wires are then woven together to form a matrix of crossover points. The fabric so formed may incorporate other supporting or strengthening fibres, such as glass fibres. The crossover points are then bonded together by the application of heat and pressure. The coating is then cross-linked by ionising radiation.

The resistance at the crossover points is temperature dependent having a positive temperature coefficient, the temperature range over which a change occurs depending on the crystalline melting points of the polymeric components in the material.

We claim:

1. A sensor matrix comprising first and second sets of conductors, the first set crossing over the second set to form a matrix of one or more crossover points, and being separated from the second set at least at one crossover point by an electrical transducer material, at least one of the sets being incorporated in a fabric.

2. A sensor according to claim 1 wherein each conductor in the first set and/or each conductor in the second set is individually surrounded by the electrical transducer material.

3. A sensor according to claim 1, wherein the transducer layer comprises electrically partially resistive material.

4. A sensor according to claim 3, wherein the partially resistive material has a resistivity at least 1000 times greater than that of the conductor with which it is associated and, if it is associated with two or more conductors of different resistivities, then it has a resistivity at least 1000 times greater than that of the conductor of the higher or highest resistivity.

5. A sensor according to claim 3, wherein the partially resistive material has a resistivity of at most $10^{10}$ ohm cm.

6. A sensor according to claim 1, wherein the first and second sets of conductors are in the form of a grid, the first set being a series of row conductors and the second set being a series of column conductors.

7. A sensor according to claim 1, wherein the fabric is a woven fabric.

8. A sensor according to claim 1, wherein the conductors are incorporated so that they project from one surface of the fabric.

9. A sensor according to claim 1, wherein the first set and the second set are both incorporated in a single fabric.

10. A sensor matrix comprising first and second sets of conductors, the first set crossing over the second set to form a matrix of one or more crossover points, at least some of the conductors being at least partially surrounded individually by a transducer layer of fibres which are helically wound around the conductors, the layer being capable of acting to produce a detectable change in electrical properties in response to a condition to be sensed by the sensor.

11. A sensor according to claim 10, wherein each conductor in the first set and/or each conductor in the second set is individually surrounded by a layer of the fibres.

12. A sensor according to claim 10, wherein the transducer layer comprises two or more layers of the fibres.

13. A sensor according to claim 10, wherein the transducer layer comprises electrically partially resistive material.

14. A sensor according to claim 10, wherein the first and second sets of conductors are in the form of a grid, the first set being a series of row conductors and the second set being a series of column conductors.

15. A sensor according to claim 10, wherein at least one of the first set and the second set of conductors is incorporated in a single fabric.

16. A sensor according to claim 10, wherein, in addition to the electrical transducer layer, the conductors are surrounded by a layer of continuous or discontinuous electrically partially resistive or conductive material.

17. A sensor matrix comprising first and second sets of conductors, the first set crossing over the second set to form a matrix of crossover points, the conductors being substantially uniformly and individually surrounded by a layer of electrical transducer material capable of acting to provide a detectable change in electrical properties in response to a condition to be sensed by the sensor.

18. A sensor according to claim 17 wherein the electrical transducer material is a continuous, particulate or fibrous layer.

19. A sensor according to claim 17, wherein the electrical transducer material is a continuous layer and at least some of the conductors have been pre-coated with the continuous layer before incorporation in the sensor.

20. A sensor according to claim 17, wherein the transducer layer comprises electrically partially resistive material.

21. A sensor according to claim 17, wherein the first and second sets of conductors are in the form of a grid, the first set being a series of row conductors and the second set being a series of column conductors.

22. A sensor matrix comprising first and second sets of conductors, the first set crossing over the second set to form a matrix of one or more crossover points, the first set being separated from the second set by a hard elastic electrical transducer material.

23. A sensor matrix comprising first and second sets of conductors, the first set crossing over the second set to form a matrix of one or more crossover points, the first set being separated from the second set by a cross-linked polymeric electrical transducer material.

24. A sensor according to claim 23, wherein the polymer is an elastomer.

25. A sensor according to claim 1 arranged to provide a separately readable electrical change at any one or more cross-over points of conductors in the array when the condition to be sensed occurs at that or those point(s).

26. A sensor according to claim 1 wherein at least some of the conductors cross over in the array and the conductors are arranged so that application of pressure to any one crossover point in use will not cause significant movement at any adjacent crossover point.

* * * * *